United States Patent
Lin et al.

(10) Patent No.: US 12,484,051 B2
(45) Date of Patent: Nov. 25, 2025

(54) WIRELESS COMMUNICATION METHOD AND USER EQUIPMENT FOR NON-CODEBOOK PUSCH TRANSMISSION

(71) Applicant: SHARP KABUSHIKI KAISHA, Sakai (JP)

(72) Inventors: Chia-Hung Lin, Taipei (TW); Chia-Hao Yu, Taipei (TW); Hsin-Hsi Tsai, Taipei (TW)

(73) Assignee: SHARP KABUSHIKI KAISHA, Sakai (JP)

(*) Notice: Subject to any disclaimer, the term of this patent is extended or adjusted under 35 U.S.C. 154(b) by 463 days.

(21) Appl. No.: 18/015,129

(22) PCT Filed: Jul. 23, 2021

(86) PCT No.: PCT/CN2021/108272
§ 371 (c)(1),
(2) Date: Jan. 9, 2023

(87) PCT Pub. No.: WO2022/028262
PCT Pub. Date: Feb. 10, 2022

(65) Prior Publication Data
US 2023/0262692 A1    Aug. 17, 2023

Related U.S. Application Data

(60) Provisional application No. 63/062,355, filed on Aug. 6, 2020.

(51) Int. Cl.
*H04W 72/1268* (2023.01)
*H04B 7/0456* (2017.01)
(Continued)

(52) U.S. Cl.
CPC ...... *H04W 72/1268* (2013.01); *H04B 7/0486* (2013.01); *H04B 7/06952* (2023.05);
(Continued)

(58) Field of Classification Search
None
See application file for complete search history.

(56) References Cited

U.S. PATENT DOCUMENTS

2019/0312617 A1* 10/2019 Wernersson .......... H04L 5/0048
2019/0349867 A1* 11/2019 MolavianJazi ....... H04W 52/16
(Continued)

FOREIGN PATENT DOCUMENTS

| CN | 111052786 A | 4/2020 | |
|---|---|---|---|
| CN | 111819801 A | * 10/2020 | ............ H04W 72/51 |

(Continued)

OTHER PUBLICATIONS

3GPP Ts 38.214 v17.4.0 (Dec. 2022) Physical Layer Procedures for data.*

(Continued)

*Primary Examiner* — Andrew C Oh
(74) *Attorney, Agent, or Firm* — ScienBiziP, P.C.

(57) ABSTRACT

A method performed by a UE for multiple Transmission Reception Points (TRPs) based non-codebook PUSCH transmission includes receiving, from a BS, configuration of two Sounding Reference Signal (SRS) resource sets with a usage parameter indicated as "non-codebook"; receiving, from the BS, an Radio Resource Control (RRC) message configuring a mapping pattern between the two SRS resource sets and a plurality of PUSCH repetitions; receiving, from the BS, an Uplink (UL) Downlink Control Information (DCI) including two SRS Resource Indicator (SRI) fields; and transmitting, to the BS, the plurality of PUSCH repetitions according to the two SRI fields indicated in the UL DCI and the mapping pattern, wherein the two SRI fields determine two precoders and two transmission ranks applied for the plurality of PUSCH repetitions associated with the (Continued)

two SRS resource sets, and a number of the two transmission ranks determined by the two SRI fields are the same.

6 Claims, 7 Drawing Sheets

(51) Int. Cl.
  *H04B 7/06* (2006.01)
  *H04L 5/00* (2006.01)
  *H04W 72/23* (2023.01)
  *H04W 72/566* (2023.01)

(52) U.S. Cl.
  CPC ........... *H04L 5/0051* (2013.01); *H04W 72/23* (2023.01); *H04W 72/566* (2023.01)

(56) References Cited

U.S. PATENT DOCUMENTS

| | | | |
|---|---|---|---|
| 2020/0212972 A1 | 7/2020 | Zhang et al. | |
| 2021/0160104 A1* | 5/2021 | Wu | H04W 72/0446 |
| 2023/0262692 A1* | 8/2023 | Lin | H04L 5/0023 370/329 |
| 2024/0008033 A1* | 1/2024 | Khoshnevisan | H04W 72/23 |
| 2024/0057071 A1* | 2/2024 | Sun | H04W 72/1268 |

FOREIGN PATENT DOCUMENTS

| | | | | |
|---|---|---|---|---|
| KR | 20220114066 A | * | 8/2022 | ............ H04W 72/23 |
| WO | WO-2020034997 A1 | * | 2/2020 | ............ H04B 7/0408 |
| WO | WO-2023080538 A1 | * | 5/2023 | ............ H04L 5/0055 |
| WO | WO-2023081107 A1 | * | 5/2023 | ............ H04L 5/0053 |
| WO | WO-2024095473 A1 | * | 5/2024 | ............... H04B 7/06 |

OTHER PUBLICATIONS

3GPP TR 38.806 v15.0.0 (Dec. 2017) Study of separation of NR Control Plane and User Plane for split option.*

CATT, "Further considerations on SRS design", R1-1710070, 3GPP TSG RAN WG1 NR-AdHoc#2, Qingdao, P.R. China Jun. 27-30, 2017, chapters 1-3.

Samsung, "Discussion on Non-Codebook-Based UL Transmission", R1-1713575, 3GPP TSG RAN WG1 Meeting #90, Prague, P.R. Czechia Aug. 21-25, 2017, chapters 1-2.

ZTE, ZTE Microelectronics, "Non-Codebook based and Hybrid based UL transmission", R1-1701793, 3GPP TSG RAN WG1 Meeting #88, Athens, Greece, Feb. 13-17, 2017, chapters 1-4.

3GPP TS 38.212 V16.2.0 (Jun. 2020), 3rd Generation Partnership Project; Technical Specification Group Radio Access Network; NR; Multiplexing and channel coding (Release 16).

3GPP TS 38.214 V16.2.0 (Jun. 2020), 3rd Generation Partnership Project; Technical Specification Group Radio Access Network; NR; Physical layer procedures for data (Release 16).

* cited by examiner

WIRELESS COMMUNICATION METHOD AND USER EQUIPMENT FOR NON-CODEBOOK PUSCH TRANSMISSION

CROSS-REFERENCE TO RELATED APPLICATION(S)

The present disclosure is a National Stage application of International Patent Application Serial No. PCT/CN2021/108272, filed on Jul. 23, 2021, which claims the benefit of and priority to U.S. Provisional Patent Application Ser. No. 63/062,355, filed on Aug. 6, 2020, entitled "MECHANISMS FOR SUPPORTING PUSCH REPETITION UNDER NON-CODEBOOK BASED UL TRANSMISSION IN MULTI-TRP". The contents of all of the above-mentioned applications are hereby fully incorporated herein by reference for all purposes.

FIELD

The present disclosure is generally related to wireless communications and, specifically, to a wireless communication method and a user equipment for non-CodeBook (non-CB) based Physical Uplink Shared Channel (PUSCH) transmission.

BACKGROUND

With the tremendous growth in the number of connected devices and the rapid increase in user/Network (NW) traffic volume, various efforts have been made to improve different aspects of wireless communication for the next-generation wireless communication system, such as Fifth-Generation (5G) New Radio (NR), by improving data rate, latency, reliability, and mobility.

The 5G NR system is designed to provide flexibility and configurability to optimize the NW services and types, accommodating various use cases, such as Enhanced Mobile Broadband (eMBB), Massive Machine-Type Communication (mMTC), and Ultra-Reliable and Low-Latency Communication (URLLC).

However, as the demand for radio access continues to increase, there is a need in the art to improve non-CodeBook (non-CB) based Physical Uplink Shared Channel (PUSCH) transmission.

SUMMARY

The present disclosure is directed to methods and user equipment (UE) for non-CodeBook (non-CB) based Physical Uplink Shared Channel (PUSCH) transmission.

In a first aspect of the present application, a method performed by a User Equipment (UE) for multiple Transmission Reception Points (TRPs) based non-codebook Physical Uplink Shared Channel (PUSCH) transmission is provided. The method includes receiving, from a Base Station (BS), configuration of two Sounding Reference Signal (SRS) resource sets with a usage parameter indicated as "non-codebook"; receiving, from the BS, a Radio Resource Control (RRC) message configuring a mapping pattern between the two SRS resource sets and a plurality of PUSCH repetitions; receiving, from the BS, an Uplink (UL) Downlink Control Information (DCI) including two SRS Resource Indicator (SRI) fields; and transmitting, to the BS, the plurality of PUSCH repetitions according to the two SRI fields indicated in the UL DCI and the mapping pattern, wherein the two SRI fields determine two precoders and two transmission ranks applied for the plurality of PUSCH repetitions associated with the two SRS resource sets, and a number of the two transmission ranks determined by the two SRI fields are the same.

In another implementation of the first aspect, the mapping pattern between the two SRS resource sets and the plurality of PUSCH repetitions is a cyclical mapping pattern.

In a second aspect of the present application, a User Equipment (UE) in a wireless communication system for multiple Transmission Reception Points (TRPs) based non-codebook Physical Uplink Shared Channel (PUSCH) transmission is provided. The UE includes at least one processor; and at least one memory coupled to the at least one processor, wherein the at least one memory stores computer-executable instructions that, when executed by the at least one processor, cause the UE to receive, from a Base Station (BS), configuration of two Sounding Reference Signal (SRS) resource sets with a usage parameter indicated as "non-codebook"; receive, from the BS, a Radio Resource Control (RRC) message configuring a mapping pattern between the two SRS resource sets and a plurality of PUSCH repetitions; receive, from the BS, an Uplink (UL) Downlink Control Information (DCI) including two SRS Resource Indicator (SRI) fields; and transmit, to the BS, the plurality of PUSCH repetitions according to the two SRI fields indicated in the UL DCI and the mapping pattern, wherein the two SRI fields determine two precoders and two transmission ranks applied for the plurality of PUSCH repetitions associated with the two SRS resource sets, and a number of the two transmission ranks determined by the two SRI fields are the same.

In a third aspect of the present application, a Base Station (BS) in a wireless communication system for multiple Transmission Reception Points (TRPs) based non-codebook Physical Uplink Shared Channel (PUSCH) transmission is provided. The BS includes at least one processor; and at least one memory coupled to the at least one processor, wherein the at least one memory stores computer-executable instructions that, when executed by the at least one processor, cause the BS to transmit, to a User Equipment (UE), configuration of two Sounding Reference Signal (SRS) resource sets with a usage parameter indicated as "non-codebook"; transmit, to the UE, a Radio Resource Control (RRC) message configuring a mapping pattern between the two SRS resource sets and a plurality of PUSCH repetitions; transmit, to the UE, an Uplink (UL) Downlink Control Information (DCI) including two SRS Resource Indicator (SRI) fields; and receive, from the UE, the plurality of PUSCH repetitions according to the two SRI fields indicated in the UL DCI and the mapping pattern, wherein the two SRI fields determine two precoders and two transmission ranks applied for the plurality of PUSCH repetitions associated with the two SRS resource sets, and a number of the two transmission ranks determined by the two SRI fields are the same.

BRIEF DESCRIPTION OF THE DRAWINGS

Aspects of the present disclosure are best understood from the following when read with the accompanying figures. Various features are not drawn to scale. Dimensions of various features may be arbitrarily increased or reduced for clarity of discussion.

DESCRIPTION

Figure 1:
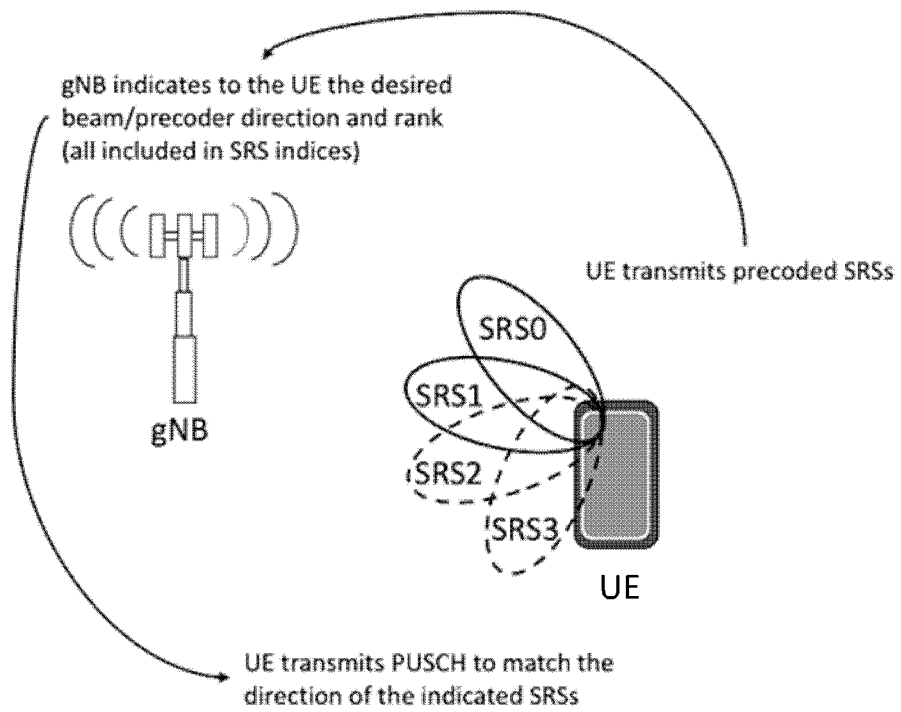
FIG. 1 illustrates an overview of non-CB based UL transmission according to an example implementation of the present disclosure.

Some acronyms in the present disclosure are defined as follows. Unless otherwise specified, the acronyms have the following meanings.

| Acronym | Full name |
| --- | --- |
| 3GPP | 3rd Generation Partnership Project |
| AS | Access Stratum |
| BS | Base Station |
| BWP | Bandwidth Part |
| CB | CodeBook |
| CSI | Channel State Information |
| DCI | Downlink Control Information |
| DL | Downlink |
| DMRS | Demodulation Reference Signal |
| gNB | Base Station |
| IE | Information Element |
| LTE | Long-Term Evolution |
| MCG | Master Cell Group |
| MCS | Modulation Coding Scheme |
| NR | New Radio |
| NW | Network |
| NZP CSI-RS | Non-Zero Power Channel State Information Reference Signal |
| OFDM | Orthogonal Frequency Division Modulation |
| QCL | Quasi Co Location |
| PCell | Primary Cell |
| PDCCH | Physical Downlink Control Channel |
| PDSCH | Physical Downlink Shared Channel |
| PSCell | Primary Secondary Cell |
| PUCCH | Physical Uplink Control Channel |
| PUSCH | Physical Uplink Shared Channel |
| RAN | Radio Access Network |
| Rel | Release |
| RI | Rank Indicator |
| RRC | Radio Resource Control |
| RS | Reference Signal |
| RV | Redundancy Version |
| SCell | Secondary Cell |
| SCG | Secondary Cell Group |
| SI | System Information |
| SpCell | Special Cell |
| SRS | Sounding Reference Signal |
| SRI | SRS Resource Indicator |
| TB | Transport Block |
| TCI | Transmission Configuration Indication |
| TPC | Transmission Power Control |
| TRP | Transmission/Reception Point |
| TS | Technical Specification |
| UE | User Equipment |
| UL | Uplink |

The following contains specific information pertaining to implementations of the present disclosure. The drawings and their accompanying detailed disclosure are directed to merely exemplary implementations. However, the present disclosure is not limited to these exemplary implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale and are not intended to correspond to actual relative dimensions.

For consistency and ease of understanding, like features are identified (although, in some examples, not illustrated) by numerals in the example figures. However, the features in different implementations may differ in other respects, and thus shall not be narrowly confined to what is illustrated in the figures.

References to "one implementation," "an implementation," "example implementation," "various implementations," "some implementations," "implementations of the present disclosure," etc., may indicate that the implementation(s) of the present disclosure may include a particular feature, structure, or characteristic, but not every possible implementation of the present disclosure necessarily includes the particular feature, structure, or characteristic. Further, repeated use of the phrases "in one implementation," "in an example implementation," or "an implementation" do not necessarily refer to the same implementation, although they may. Moreover, any use of phrases like "implementations" in connection with "the present disclosure" are not meant to characterize that all implementations of the present disclosure must include the particular feature, structure, or characteristic, and should instead be understood to mean "at least some implementations of the present disclosure" include the stated particular feature, structure, or characteristic.

The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-disclosed combination, group, series, and the equivalent.

The term "and/or" is only an association relationship for describing associated objects, and represents that three relationships may exist: for example, A and/or B may represent that A exists alone, A and B exist at the same time, and B exists alone. "A and/or B and/or C" may represent that at least one of A, B and C exists. In addition, the character "/" generally represents that the former and latter associated objects are in an "or" relationship.

Additionally, for the purpose of non-limiting explanation, specific details, such as functional entities, techniques, protocols, standards, and the like, are set forth for providing an understanding of the disclosed technology. In other examples, a detailed disclosure of well-known methods, technologies, systems, architectures, and the like are omitted in order not to obscure the present disclosure with unnecessary details.

Persons skilled in the art will immediately recognize that any NW function(s) or algorithm(s) in the present disclosure may be implemented by hardware, software, or a combination of software and hardware. Disclosed functions may correspond to modules that may be software, hardware, firmware, or any combination thereof. The software implementation may include computer-executable instructions stored on computer-readable media, such as memory or other types of storage devices.

For example, one or more microprocessors or general-purpose computers with communication processing capability may be programmed with corresponding executable instructions and carry out the disclosed NW function(s) or algorithm(s). The microprocessors or general-purpose computers may be formed of Application-Specific Integrated Circuits (ASICs), programmable logic arrays, and/or one or more Digital Signal Processor (DSPs). Although some of the example implementations in the present disclosure are directed to software installed and executing on computer hardware, alternative example implementations implemented as firmware, as hardware, or as a combination of hardware and software are well within the scope of the present disclosure.

The computer-readable medium includes, but is not limited to, Random Access Memory (RAM), Read-Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication NW architecture (e.g., an LTE system, an LTE-Advanced (LTE-A) system, or an LTE-Advanced Pro system) typically includes at least one BS, at least one UE, and one or more optional NW elements that provide connection towards an NW. The UE communicates with the NW (e.g., a Core Network (CN), an Evolved Packet Core (EPC) NW, an Evolved Universal Terrestrial Radio Access NW (E-UTRAN), a Next-Generation Core (NGC), a 5G Core Network (5GC), or an Internet) through a RAN established by the BS.

It should be noted that, in the present disclosure, a UE may include, but is not limited to, a mobile station, a mobile terminal or device, or a user communication radio terminal. For example, a UE may be a portable radio equipment, which includes, but is not limited to, a mobile phone, a tablet, a wearable device, a sensor, or a Personal Digital Assistant (PDA) with wireless communication capability. The UE is configured to receive and transmit signals over an air interface to one or more cells in a RAN.

A BS may include, but is not limited to, a Node B (NB) as in the Universal Mobile Telecommunication System (UNITS), an evolved Node B (eNB) as in the LTE-A, a Radio NW Controller (RNC) as in the UNITS, a Base Station Controller (BSC) as in the Global System for Mobile communications (GSM)/GSM EDGE Radio Access NW (GERAN), a Next Generation eNB (ng-eNB) as in an E-UTRA BS in connection with the 5GC, a gNB as in the 5G Access NW (5G-AN), and any other apparatus capable of controlling radio communication and managing radio resources within a cell. The BS may connect to serve the one or more UEs through a radio interface to the NW.

A BS may be configured to provide communication services according to at least one of the following Radio Access Technologies (RATs): Worldwide Interoperability for Microwave Access (WiMAX), GSM (often referred to as 2G), GERAN, General Packet Radio Service (GPRS), UNITS (often referred to as 3G) based on basic Wideband-Code Division Multiple Access (W-CDMA), High-Speed Packet Access (HSPA), LTE, LTE-A, enhanced L (eLTE), NR (often referred to as 5G), and LTE-A Pro. However, the scope of the present disclosure should not be limited to the protocols previously disclosed.

The BS may be operable to provide radio coverage to a specific geographical area using a plurality of cells included in the RAN. The BS may support the operations of the cells. Each cell is operable to provide services to at least one UE within its radio coverage. More specifically, each cell (often referred to as a serving cell) may provide services to serve one or more UEs within its radio coverage, (e.g., each cell schedules the DL and optionally UL resources to at least one UE within its radio coverage for DL and optionally UL packet transmissions). The BS may communicate with one or more UEs in the radio communication system through the plurality of cells. A cell may allocate sidelink (SL) resources for supporting proximity service (ProSe). Each cell may have overlapped coverage areas with other cells.

In Multi-RAT Dual Connectivity (MR-DC) cases, the primary cell of an MCG or an SCG may be called a SpCell. A PCell may refer to the SpCell of an MCG. A PSCell may refer to the SpCell of an SCG. MCG refers to a group of serving cells associated with the Master Node (MN), including the SpCell and optionally one or more SCells. SCG refers to a group of serving cells associated with the Secondary Node (SN), including of the SpCell and optionally one or more SCells.

In some implementations, the UE may not have (LTE/NR) RRC connections with the concerned serving cells of the associated services. In other words, the UE may not have UE-specific RRC signaling exchange with the serving cell. Instead, the UE may only monitor the DL synchronization signals (e.g., DL synchronization burst sets) and/or broadcasting SI related to the concerned services from such serving cells. In addition, the UE may have at least one serving cell on one or more target SL frequency carriers for the associated services. In some other implementations, the UE may consider the RAN which configures one or more of the serving cells as a serving RAN.

As previously disclosed, the frame structure for NR supports flexible configurations for accommodating various next-generation (e.g., 5G) communication requirements, such as eMBB, mMTC, and URLLC, while fulfilling high reliability, high data rate, and low latency requirements. The OFDM technology, as disclosed in 3GPP, may serve as a baseline for an NR waveform. The scalable OFDM numerology, such as the adaptive sub-carrier spacing, the channel bandwidth, and the cyclic prefix (CP), may also be used. Additionally, two coding schemes are considered for NR: (1) low-density parity-check (LDPC) code and (2) polar code. The coding scheme adaption may be configured based on the channel conditions and/or service applications.

It is also considered that in a transmission time interval of a single NR frame, at least DL transmission data, a guard period, and UL transmission data should be included. The respective portions of the DL transmission data, the guard period, and the UL transmission data should also be configurable, for example, based on the NW dynamics of NR. In addition, SL resources may also be provided in an NR frame to support ProSe services.

Some background terms are presented in the following:

Antenna Panel: This is a conceptual term for UE antenna implementation. It may be assumed that a panel is an operational unit for controlling a transmit spatial filter (beam). A panel may typically include a plurality of antenna elements. In some implementations, a beam may be formed by a panel, and two panels are needed in order to form two beams simultaneously. Such simultaneous beamforming from multiple panels is subject to UE capability. A similar definition for "panel" may be possible by applying spatial receiving filtering characteristics.

Beam: This is replaced by spatial filter. For example, when a UE reports a preferred gNB TX beam, the UE may essentially select a spatial filter used by the gNB. The term "beam information" is used to provide information about which beam/spatial filter may be used/selected. In some implementations, individual reference signals are transmitted by applying individual beams (spatial filters). Thus, the term "beam" or "beam information" may be represented by reference signal resource index(es).

DCI: This includes various DCI formats used in LTE in PDCCH. The DCI format is a predefined format, where the DCI may be packed/formed and transmitted in PDCCH.

TCI state: This contains parameters for configuring a QCL relationship between one or two DL RSs and a target RS set. For example, a target RS set may be the DMRS ports of PDSCH or PDCCH.

HARQ: This is a functionality that ensures delivery between peer entities at Layer 1 (e.g., Physical Layer). A single HARQ process supports one TB when the physical layer is not configured for DL/UL spatial multiplexing. When the physical layer is configured for DL/UL spatial multiplexing, the single HARQ process supports one or multiple TBs. There is one HARQ entity per serving cell. Each HARQ entity supports a parallel (number) of DL HARQ process and UL HARQ process.

For PUSCH in 3GPP NR systems, two types of transmissions are supported in NR, namely CB based and non-CB based transmission. The UE is configured with CB based transmission or non-CB based transmission by the higher layer parameter txConfig in pusch-Config. When txConfig is set to 'CB', the UE is configured with CB-based PUSCH transmission. Similarly, the UE is configured with non-CB based PUSCH transmission when the txConfig is set to 'non-CB'. PUSCH can be scheduled by DCI format 0_0 or DCI format 0_1, or semi-statically configured by a higher layer parameter (e.g., configuredGrantConfig in BWP-UplinkDedicated IE).

Different from CB-based PUSCH transmission, for non-CB based PUSCH transmission, the UE may determine its PUSCH precoder and transmission rank (or layer) based on an SRI, which may be given by DCI or a higher layer parameter (e.g., srs-ResourceIndicator). For training the PUSCH precoder, an SRS resource set may have its usage set to "noncodebook" for such purpose. A UE may test some candidate precoders by non-CB SRS resource transmission. The UE can derive the candidate precoders based on measurements on an associated NZP CSI-RS. Specifically, there are some steps that may be performed for NR non-CB based PUSCH transmission in the following.

Step 1: Report UE capability on non-CB based PUSCH transmission from the UE side to the gNB side.

Step 2: Configure a non-CB SRS resource set(s) from the gNB side to the UE side.

Step 3: Calculate UL candidate SRS precoders at the UE side.

Step 4: Precode SRS resource transmission from the UE side to the gNB side.

Step 5: SRS resource selection at the gNB side.

Step 6: Provide transmission parameters such as SRI or DMRS port indicator via scheduling DCI and/or an RRC parameter (e.g., via ConfiguredGrantConfig) from the gNB side to the UE side.

Step 7: Transmit PUSCH based on the transmission parameters provided by scheduling DCI and/or a RRC parameter (e.g., via ConfiguredGrantConfig) from the UE side to the gNB side.

In Rel-16 NR, PDSCH repetition is applied for multi-TRP for URLLC purposes (e.g., enhancing the reliability of PDSCH transmission under a multi-TRP scenario). Based on the development of PDSCH enhancement in multi-TRP, the enhancement of other physical channels (e.g., PUSCH, PDCCH, PUCCH) in multi-TRP is to be discussed in Rel-17. Like PDSCH enhancement in Rel-16, the Rel-17 PUSCH enhancement may also utilize repetition mechanisms to increase transmission reliability, with different repetitions targeting different TRPs. For these repetition mechanisms, most transmission parameters (e.g., RI, MCS, TPC, and so on) are carried in a single scheduling DCI for informing the UE how to perform transmission for individual repetitions.

Please refer to FIG. 1, which illustrates an overview of non-CB based UL transmission according to an example implementation of the present disclosure. As shown in FIG. 1, for the non-CB based PUSCH transmission, after a UE transmits multiple SRSs with different spatial properties (e.g., precoders), the gNB may indicate to the UE the desired precoder(s) and rank (or layer) by selecting a subset of the multiple SRSs and informing the UE of the subset via PDCCH. Finally, the UE may transmit the PUSCH to the gNB with spatial domain properties (e.g., spatial transmission filter) following those of the indicated SRSs.

In a multi-TRP scenario, considering that different TRPs may be located at different geographic positions, it may not be reasonable to always assume the same transmit parameters (e.g., SRIs, RIs) for PUSCH transmissions toward different TRPs. For example, it may not be desirable to use the same beam/precoder direction or rank (or layer) for each PUSCH repetition in one PUSCH transmission under the multi-TRP scenario if each PUSCH repetition in one PUSCH transmission targets different TRPs. Therefore, it is important to indicate multiple sets of transmission parameters to the UE for repetitive PUSCH repetition(s) in the multi-TRP scenario.

Larger channel attenuation is expected for higher frequency bands, such as those in Frequency Range 2 (FR2). To compensate for the additional channel loss, beamforming technology is commonly applied. A UE with beamforming capability is usually equipped with multiple antenna panels. With each antenna panel providing spatial coverage potential in a different direction, multiple antenna panels contribute to an aggregated spatial coverage in an isotropic/omnidirectional manner. As a result, selecting applicable panels for the PUSCH repetitions, as mentioned above, may be another issue for PUSCH enhancement in multi-TRP. Noticeably, since a panel is a basic unit for beamforming, beam indication may need to be jointly considered with panel selection/indication.

Each PUSCH repetition may be targeted at respective TRPs via different beams/precoders if multi-beam/precoder transmission is supported in one PUSCH transmission containing multiple PUSCH repetitions. In such case, performing beam cycling for different PUSCH repetitions may be needed. Since two consecutive beams formed by different panels may result in a longer latency, more switching time may be needed.

For non-CB based PUSCH transmission, as mentioned in above Step 1, the UE may need to report its capability (e.g., the maximum number of layers) so that the gNB may decide the rank (or layer) for PUSCH transmission according to corresponding UE capability. Then the gNB may configure SRS resource set(s) to the UE for channel training purposes. In Rel-15/Rel-16, a SRS resource set associated with non-CB based PUSCH transmission may contain up to 4 SRS resources, and each SRS resource in a SRS resource set may be associated with the same UL beam and/or panel.

After the UE transmits the SRS resource(s) in the SRS resource set to the gNB, the gNB may perform channel estimation to select an available SRI that may include the information of beam/precoder and rank (or layer). The gNB-selected SRI may essentially carry information of a subset of the SRS resource(s) sent earlier for UL channel estimation purposes. Afterward, the gNB-selected SRI may be provided to the UE via DCI signaling to indicate the spatial domain property for scheduled PUSCH transmission (s). The SRS resource selection may be accompanied by panel selection since each SRS resource in the SRS resource set may be transmitted by a beam that is associated with one corresponding panel. Thus, the SRI provided in a scheduling DCI may be regarded a including panel indication as well.

Figure 2:
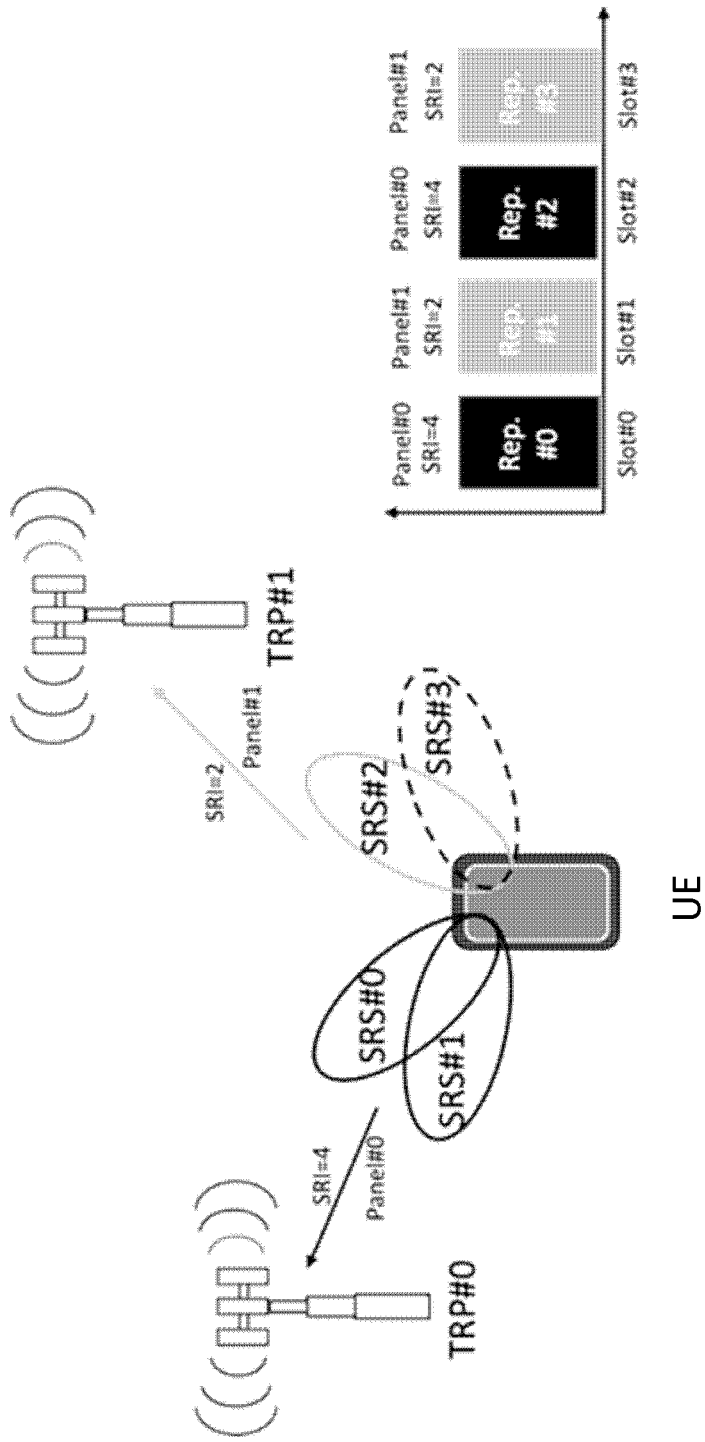
FIG. 2 illustrates an overview of non-CB (NCB) based PUSCH repetition with an TRP-specific SRI indication according to an example implementation of the present disclosure.

Please refer to FIG. 2, which illustrates an overview of non-CB based PUSCH repetition with an TRP-specific SRI indication according to an example implementation of the present disclosure. As shown in FIG. 2, the multi-TRP based PUSCH repetition scheme (e.g., slot-based repetition) is introduced. For a scheduled PUSCH transmission (corresponding to a UL TB(s)), several repetitions may be performed. For different repetitions of the UL TB(s), different transmit parameters may be applied (e.g., spatial domain properties as a result of selected UE panel and UL spatial filter), and the UL precoder may be different. Different repetitions may be transmitted by using different time-domain resources and share the same frequency-domain resources. It is introduced with a single-PDCCH based approach, where the PUSCH repetitions are scheduled by a single PDCCH. Thus, some implementations for the above issues are presented in the following.

UE Capability Reporting

The UE may need to be equipped with some capabilities (e.g., fast panel switching) and carry out the instruction signaled in the DCI while the UE uses different UL beams/precoders for transmitting different PUSCH repetitions. As shown in FIG. 2, repetitions such as Rep. #0 and Rep. #2 may apply Panel #0 and parameters corresponding to SRI=4 (e.g., UL beam direction and rank (or layer) mapped by SRI=4) to transmit PUSCH repetitions Rep. #0 and Rep. #2 of a UL TB towards TRP #0, and the repetitions Rep. #1 and Rep. #3 may apply Panel #1 and parameters corresponding to SRI=2 (e.g., beam direction and rank (or layer) mapped by SRI=2) to transmit PUSCH repetitions Rep. #0 and Rep. #2 of the UL TB towards TRP #1. Noticeably, panel information may be explicitly provided in the DCI, or may be implicitly provided in an SRI field or other fields in the DCI. Accordingly, the panel switching may be needed in two neighboring time slots with the following solutions.

The UE may explicitly inform the NW whether the UE can support fast panel switching for PUSCH repetition and/or configured PUSCH (e.g., type 1 and/or type 2 configured grant) repetition.

The UE may directly inform the NW whether the UE can support multiple SRI/beam(s)/rank(s) (or layer(s)) signaling for PUSCH repetition in multi-TRP.

The UE may directly inform the NW whether the UE can support multiple SRI/beam(s)/rank(s) (or layer(s)) signaling for configured PUSCH (e.g., type 1 and/or type 2 configured grant) repetition in multi-TRP.

The UE may support fast panel switching if the UE supports the PUSCH transmission in multi-TRP.

SRS Configuration for Non-CB Based PUSCH Transmission

Similarly to the concept of using the available beams to transmit PUSCH to different TRPs, the UE may also use an available panel (e.g., the panel providing the largest channel gain) to transmit PUSCH to different TRPs. During a channel training (or beam training) phase, different SRS resources may be transmitted by using different UL beams, which in turn may be associated with different panels. In some implementations, a maximum number of SRS resources in an SRS resource set may be increased in order to increase the panel diversity if the UE can be equipped with more than 2 panels. When the SRS resources extension is allowed, the related information may carry essential information (e.g., power-related information, beam-related information (e.g., beam indications), rank (or layer) indication(s), SRS resource index(es) used for the derivation of the essential information, panel indications, and so on), which may be, but is not limited to being, used for UL transmission, for example, PUSCH transmission. Noticeably, the mentioned related information may be provided via a UL TCI field and/or an SRI in the DCI.

In addition to the SRS resource extension being necessary for PUSCH transmission in multi-TRP, the relationship among panels, SRS resources, SRS resource sets, and/or TRPs may be known for both the gNB and the UE, and some implementations are introduced in the following.

In one implementation, multiple NZP-CSI-RS resources may be configured to, and associated with, multiple non-codebook SRS resource sets for non-CB PUSCH transmission in a multi-TRP scenario. In some implementations, each of the NZP-CSI-RSs may be associated with each of the non-CB SRS resource sets. In some implementations, the UE may not expect spatial relation information for SRS resource(s) within a non-CB SRS resource set as well as the associated NZP-CSI-RS of the non-CB SRS resource set that is configured at the same time. Noticeably, each non-CB SRS resource set may correspond to a different UE panel. The beam information related to non-CB SRS resource transmission from different panels may be derived by the associated NZP-CSI-RSs (e.g., by doing the channel estimation on associated NZP-CSI-RSs or acquiring the QCL information of the associated NZP-CSI-RS resources).

In one implementation, each SRS resource may directly repeat in the time domain with a timing gap/offset for extending SRS resources in an SRS resource set. Multiple NZP-CSI-RSs transmitted by different TRPs may be associated with respective SRS repetitions. More details are presented in the following:

The number of TRPs may be provided to the UE via RRC message or SI.

The number of repetitions may be provided to the UE via RRC message or SI.

The timing gap/offset between two SRS repetitions transmitted to different TRPs may be zero.

In one implementation, the number of SRS resources transmitted by each panel may be configured to the UE by the NW. In one implementation, a number of SRS resource sets configured by the NW may be the same as a number of panels that the UE reports (e.g., via UE capability information) to the NW. The physical resources (e.g., time and frequency resources) allocated to transmit each SRS resource set may not be configured to be overlapped in time domain.

If the UE is indicated to perform PUSCH repetition in multi-TRP, a maximum number of SRS resources in one SRS resource set may be limited to N. More details are presented in the following:

- The value N may be equal to or less than four for non-CB based PUSCH transmission.
- The value N may be equal to or less than two for CB based PUSCH transmission.
- The value N may be predefined.
- The value N may be decided by UE capability. In some implementations, if the UE only supports one-panel transmission, the value N may be four; if the UE supports two-panel transmission, the value N may be two.
- The value N may be decided by the number of TRPs. In some implementations, if the UE is indicated to transmit PUSCH to two TRPs, the value N may be two; if a UE is indicated to transmit PUSCH to four TRPs, the value N may be one.
- The value N may be configured to the UE from the gNB (e.g., via RRC configuration and/or DCI indication).

Multiple SRIs (e.g., Beam Directions and Rank (or Layer) Indications) Signaling for PUSCH Repetition in Multi-TRP If the single DCI could carry multiple SRIs (e.g., the indication(s) being used to indicate which panel, beam, and/or rank (or layer) may be used for UL transmission), the DCI format may be modified to support and carry multiple SRIs (or at least one of panel indications, beam indications, and rank (or layer) indications). For the DCI modification on supporting SRIs (or at least one of panel indications, beam indications, and rank (or layer) indications) in single DCI, the following solutions may be utilized.

In one implementation, it is introduced to add an extra SRI field (or at least one of panel indication field(s), beam indication field(s), and rank (or layer) indication field(s)) for PUSCH transmission in multi-TRP.

- At least two SRI fields (or at least one or more of panel indication fields, beam indication fields, and rank (layer) indication fields) may be supported in the UL DCI format (e.g., DCI format 0_0, DCI format 0_1, DCI format 0_2, and/or a new DCI format).

In one implementation, it is introduced to extend a bit length of an SRI field.

- The bit length may be related to the number of TRPs.
- The bit length of the SRI field (or at least one of panel indications, beam indications, and rank (or layer) indications) may be increased, and the increased bit length may be related to the number of TRPs or the number of UE panels. In some implementations, when the bit length is related to the number of UE panels, only the number of active UE panels may influence the bit length.

Noticeably, the SRI field (e.g., panel indication field(s), beam indication field(s), and/or rank (or layer) indication field(s)) may be used for indicating which panel, beam, and/or rank (or layer) can be used to transmit PUSCH implicitly. Besides, the SRI field may be included in the UL TCI field (e.g., the field(s) being used to provide UL transmission related parameters) and be carried in the DCI.

RV, Ranks (or Layers), Panels Scheduling for Each PUSCH Repetition of the UL TB

Each PUSCH repetition triggered by the same DCI may be associated with different RVs, ranks (or layers), and/or panels, and individual PUSCH repetitions may be defined in the following.

Figure 3:
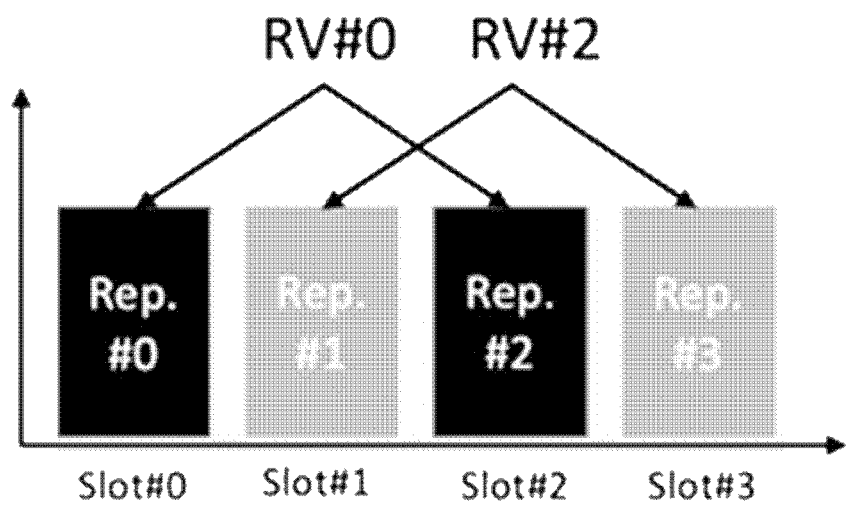
FIG. 3 illustrates an overview of spreading coded bits related to the same Redundancy Version (RV) to different PUSCH repetitions of the UL Transport Block (TB) according to an example implementation of the present disclosure.

In one implementation, the single codeword may be mapped/spread to N PUSCH repetitions. Please refer to FIG. 3, which illustrates an overview of spreading coded bits related to the same RV to different PUSCH repetitions of the UL TB according to an example implementation of the present disclosure. As shown in FIG. 3, the codeword related to RV #0 may be mapped/spread to PUSCH Rep. #0 and Rep. #2 in PUSCH transmission. Similarly, the codeword related to RV #2 may be mapped/spread to PUSCH Rep. #1 and Rep. #3 in PUSCH transmission.

In one implementation, the RV indicated to each PUSCH repetition of the UL TB for transmission may be predefined. For example, RV #0, #2, #3 and #1 may be indicated to PUSCH Rep. #0, Rep. #1, Rep. #2 and Rep. #3 for transmission, respectively, according to the predefined RV-to-PUSCH mapping rule.

In one implementation, the same rank (or layer) and/or panel may be applied to a whole PUSCH repetition of the UL TB, e.g., a number of transmit rank (or layer) indicated by the second SRI field may be same as (or may be limited to) a number of transmit rank (or layer) indicated by the first SRI field. In one implementation, the rank (or layer) and/or panel may be switched between two contiguous PUSCH repetitions of the UL TB. For example, two rank (or layer) values (e.g., 1 and 2) and the number of PUSCH repetition of the UL TB (e.g., 4) are configured to the UE, such that the UE may apply panel #0 and rank (or layer) value 1 to transmit PUSCH Rep. #0 and Rep. #2, and may apply panel #1 and rank (or layer) value 2 to transmit PUSCH Rep. #1 and Rep. #3.

For the PUSCH enhancement in multi-TRP, there may be only one active transmission panel at a time. The UE may need to support panel switching in order to handle the instruction from the gNB. For example, the gNB may request the UE to perform PUSCH repetition of one UL TB in a set of slots with UL resources, and PUSCH repetitions of the UL TB transmitted in different transmission instants or different slots may be transmitted via different panels towards different TRPs. The set of slots may be consecutive slots (with UL resources) or non-contiguous slots. As such, the UE may need to switch between panels for different slots indicated for PUSCH transmission. The panel switch is termed as the fast panel switch since two neighboring transmission instants (e.g., two neighboring slots) may correspond to transmissions based on different panels. It is introduced in some aspects of UE capability in the following.

In one aspect, beam/precoder switch latency may be different for inter-panel beam switch and intra-panel beam switch. In one aspect, transmission parameters may be different for different precoders and/or different panels. The transmission parameters may include at least one of precoder, transmit rank (or layer), and panel. The transmission parameter may further include beam information, e.g., spatial relation information that provides spatial transmission filtering information.

In some implementations, the UE may inform the gNB whether the UE can support multiple sets of transmission parameters (e.g., SRI and/or panel indication) for PUSCH repetition in multi-TRP via explicit signaling and/or implicit ways. More details of UE capability reporting may be introduced in the following.

In some implementations, if the number of panels that UE reports to the NW is larger than or equal to K, the UE may support fast panel switching. The NW may indicate multiple sets of transmission parameters (e.g., one of SRIs, beam information, and panel indications, or at least any two of the previous parameters) to the UE for performing PUSCH repetition in multi-TRP.

The K value may be predefined. In one example, K=1.

The K value may be configured by the NW via RRC message or SI.

In some implementations, the UE may be requested to report whether the UE can support the fast panel switching and/or PUSCH repetition in multi-TRP via RRC signaling (e.g., UE capability information).

In some implementations, the UE may report whether the UE can support the fast panel switching and/or PUSCH repetition mechanism in multi-TRP via RRC signaling (e.g., UE capability information). In one example, if the UE supports fast panel switching, multiple SRS resource sets (e.g., "noncodebook" SRS resource sets or "codebook" SRS resource sets) may be configured to the UE for SRS transmission.

In another example, if the UE supports PUSCH repetition in multi-TRP, multiple SRS resource sets with its usage configured to "noncodebook" may be configured. The "noncodebook" SRS resource sets may be used for channel training for non-CB based PUSCH transmission. For example, the UE may perform PUSCH repetitions of one UL TB by beam cycling. Specifically, assuming four PUSCH repetitions of the UL TB is indicated, the UE may apply beam #0 to transmit PUSCH Rep. #0 and Rep. #2 and apply beam #1 to transmit PUSCH Rep. #1 and Rep. #2. Noticeably, the mapping between beams and PUSCH repetitions of the UL TB may be explicitly configured via DCI, RRC message or SI; alternatively, the mapping between beams and PUSCH repetitions of the UL TB may be determined by the UE. The beams may correspond to the same UE panel.

In another example, if the UE supports the fast panel switching and PUSCH repetition in multi-TRP, the UE may transmit PUSCH repetitions of one UL TB by panel cycling. Specifically, assuming that the UE supports two-panel transmission and four PUSCH repetitions of the UL TB are configured to the UE, the UE may apply panel #0 to transmit PUSCH Rep. #0 and Rep. #2 and apply panel #1 to transmit PUSCH Rep. #1 and Rep. #2. Noticeably, the mapping between panels and PUSCH repetitions of the UL TB may be explicitly configured via DCI, RRC message or SI; alternatively, the mapping between panels and PUSCH repetitions of the UL TB may be determined by the UE.

In another example, the UE may support both the fast panel switching and PUSCH repetition in multi-TRP. The UE may perform PUSCH repetitions of one UL TB by beam cycling. Specifically, assuming four PUSCH repetitions of the UL TB being indicated, the UE may apply beam #0 to transmit PUSCH Rep. #0 and Rep. #2 and apply beam #1 to transmit PUSCH Rep. #1 and Rep. #2. Noticeably, the mapping between beams and PUSCH repetitions of the UL TB may be explicitly configured via DCI, RRC message or SI; alternatively, the mapping between beams and PUSCH repetitions of the UL TB may be determined by the UE. Beam #0 and beam #1 may correspond to different UE panels.

In some implementations, the UE may report whether the UE can support the fast panel switching and/or PUSCH repetition in multi-TRP when the UE establishes the connection to the NW (e.g., when the UE is in RRC_CONNECTED state).

In some implementations, the UE may be indicated to perform PUSCH repetition in multi-TRP via RRC signaling and/or DCI.

In one example, if the UE is indicated to perform PUSCH repetition in multi-TRP, the UE may expect that the received DCI may indicate multiple sets of transmission parameters to perform PUSCH repetition in multi-TRP. In another example, the transmission parameters may be indicated by the SRI field. The multiple sets of transmission parameters mean multiple SRI fields. In another example, panel information may not be implied by the SRI field. The panel information may be indicated by a further DCI field. In another example, the UE is enabled to perform PUSCH transmission repetition by RRC configuration message. The UE determines whether to perform PUSCH transmission repetition for one UL TB based on dynamic DCI indication.

More specifically, the NW may initiate a procedure to the UE in RRC_CONNECTED state when the NW needs (additional) UE radio access capability information. The NW may retrieve UE capabilities only after Access Stratum (AS) security activation. The NW may not forward UE capabilities that have been retrieved before AS security activation to the CN. Specifically, upon the UE receiving UECapabilityEnquiry, the UE may send the UE capability information.

SRS Configuration for Non-CB Based PUSCH Transmission in Multi-TRP

For non-CB based PUSCH enhancement in multi-TPR, extension to SRS resources configuration may be needed. For example, the maximum number of SRS resources configured in one SRS-NCB resource set (e.g., SRS resource set with its usage configured as "noncodebook") may be larger than four, or the number of SRS-NCB resource sets may be larger than one in order to include panel diversity. More details are introduced in the following.

In some implementations, if the UE supports PUSCH repetition in multi-TRP, the UE may expect that the maximum number of SRS resources may be (larger than or equal to) N, where the value N may be larger than four. The number of SRS resources in one SRS resource set used for non-CB based PUSCH transmission may be configured from one to N. More details are presented below:

The value N may be predefined.

The value N may be configured by the NW via RRC message or SI.

In some implementations, the UE may inform the gNB that the UE can support PUSCH repetition in multi-TRP, and then the UE may expect that the maxNrofSRS-Resources may be N, where N may be equal or larger than four. If the UE does not support the fast panel switching and/or PUSCH repetition in multi-TRP, the UE may expect that the maxNrofSRS-Resources may be four.

In some implementations, if the UE is indicated to perform PUSCH repetition in multi-TRP, the NW may inform the UE of the number of TRP(s) via RRC message or SI.

In one implementation, the SRS resources used to transmit to different TRPs may be scheduled to the same slot. In one implementation, the SRS resources used to transmit to different TRPs may be scheduled to the different symbols and/or slots. In one implementation, the SRS resources used to transmit to different TRPs may be scheduled to different frequency resources. In one implementation, the SRS resources used to transmit to different TRPs may be scheduled to the same slot but different OFDM symbols. In one implementation, the SRS resources used to transmit to different TRPs may be scheduled to the same physical resources (e.g., the same time and frequency domains).

In one implementation, if the UE is provided the number of SRS repetitions, K1, the timing gap between SRS resources used for each TRP may be configured to the UE via SI, RRC signaling, or DCI. For example, some parameters used for SRS configuration (e.g., srs-Bandwidth, freqDomainPosition, duration, transmissionComb, cychcshift, etc.) may be indicated to the UE. If the timing gap (e.g., one OFDM symbol) and the number of SRS repetitions (e.g., K1=2) are provided to the UE, the UE may directly repeat SRS transmission after one OFDM symbol. Noticeably, the number of SRS repetitions may be explicitly indicated to the UE via DCI, RRC message, or SI. Or the number of SRS repetitions may be related to the number of panels that the UE reports and/or the number of TRPs. For example, if the UE reports that the UE can support N active panel transmissions, the number of SRS repetitions may be N.

Figure 4:
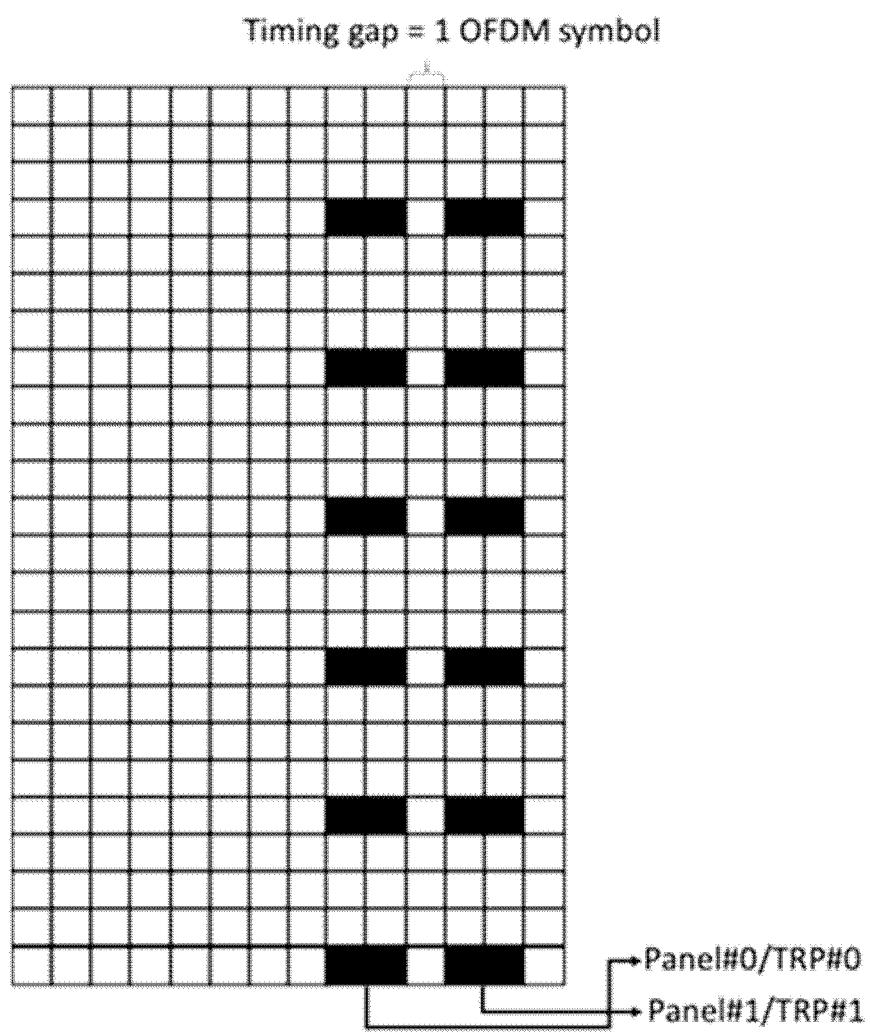
FIG. 4 illustrates an overview of SRS resources configured to the UE according to an example implementation of the present disclosure.

Please refer to FIG. 4, which illustrates an overview of SRS resources configured to the UE according to an example implementation of the present disclosure. In one example, as shown in FIG. 4, the UE is equipped with two panels and targets towards two TRPs. Specifically, the number of panels that the UE reports to the gNB is two and/or the number of TRPs is two. In addition, the parameters used for SRS transmission may be indicated to the UE (e.g., transmissionComb=n4, duration=n2, and the timing gap/offset may be given as one OFDM symbol). Then the SRS resource transmitted by another panel may be repeated after one OFDM symbol from the SRS given by the NW. In another example, the timing gap between each SRS resource used for different TRPs may be 0.

In one implementation, if the UE is configured with more than one SRS-NCB resource set for SRS transmission, the UE may expect no interleaved SRS resources in time domain between the SRS-NCB resource sets. In one example, SRS resources corresponding to one SRS-NCB resource set may be locally distributed in a time span. Within the time span, there is no SRS resource(s) from another SRS-NCB resource set. In one example, individual SRS-NCB resource sets may correspond to channel training for individual UE panels.

Considering the SRS resource configuration extension presented above, the relationship among panels, SRS resources, and TRPs may need to be known for both the gNB and the UE. As such, more solutions are introduced in the following.

In some implementations, if the UE is indicated to perform PUSCH repetition in multi-TRP, the NW may indicate to the UE the number of repetitions via RRC message or SI. Additionally, the NW may indicate to the UE the period of repetition. When the UE receives the indications, the UE may need to perform PUSCH transmission via different panels for each repetition.

In some implementations, SRS resources transmitted by each panel may be configured to the UE for SRS transmission. In one example, the UE may inform the NW that the UE has four panels which may be used for, e.g., PUSCH transmission. The maximum number of SRS resources in an SRS resource set may be sixteen. Then SRS resources #2, #4, #5, #7, #9, #10, #13, and #19 may be configured to the UE for SRS transmission. This configuration may implicitly indicate that the UE use panel #0 to transmit SRS resources #2 and #4, use panel #1 to transmit SRS resources #5 and #7, use panel #2 to transmit SRS resources #9 and #10, and use panel #3 to transmit SRS resources #13 and #19.

In some implementations, the number of SRS resource sets configured to the UE may be the same as the number of panels that the UE informs the NW that the UE can use for PUSCH transmission. Such configuration of multiple SRS-NCB resource sets may be further configured for multi-TRP based PUSCH transmission.

In one implementation, the UE may inform the NW that the UE can use up to X panels for PUSCH transmission in multi-TRP, for example, X=3 or 4. Then the UE may expect that the UE may be configured with up to X SRS resource sets by the NW when the UE performs PUSCH repetition in multi-TRP.

In some implementations, the physical resources allocated to transmit the individual SRS-NCB resource sets configured for individual panels may not be overlapped in time domain.

In one implementation, the timing gap between two SRS resource sets may be provided to avoid overlapping between SRS resource sets. The timing gap may be predefined. Alternatively, the timing gap may be configured by the NW via RRC message or SI.

In one example, if the UE is configured more than one SRS-NCB resource set for SRS transmission, the UE may expect no interleaved SRS resources in time domain between the SRS-NCB resource sets. In one example, SRS resources corresponding to one SRS-NCB resource set may be locally distributed in a time span. Within the time span, there is no SRS resource(s) from other SRS-NCB resource set. In one example, individual SRS-NCB resource sets may correspond to channel training for individual UE panels. In another example, a timing gap constraint may be applied for SRS resources belonging to different SRS-NCB resource sets if the SRS resources are to be transmitted subsequently. Alternatively, there may be no such timing gap constraint for SRS resources belonging to the same SRS-NCB resource sets if the SRS resources are to be transmitted subsequently. In another example, the timing gap between each SRS resource set may be zero.

Figure 5:
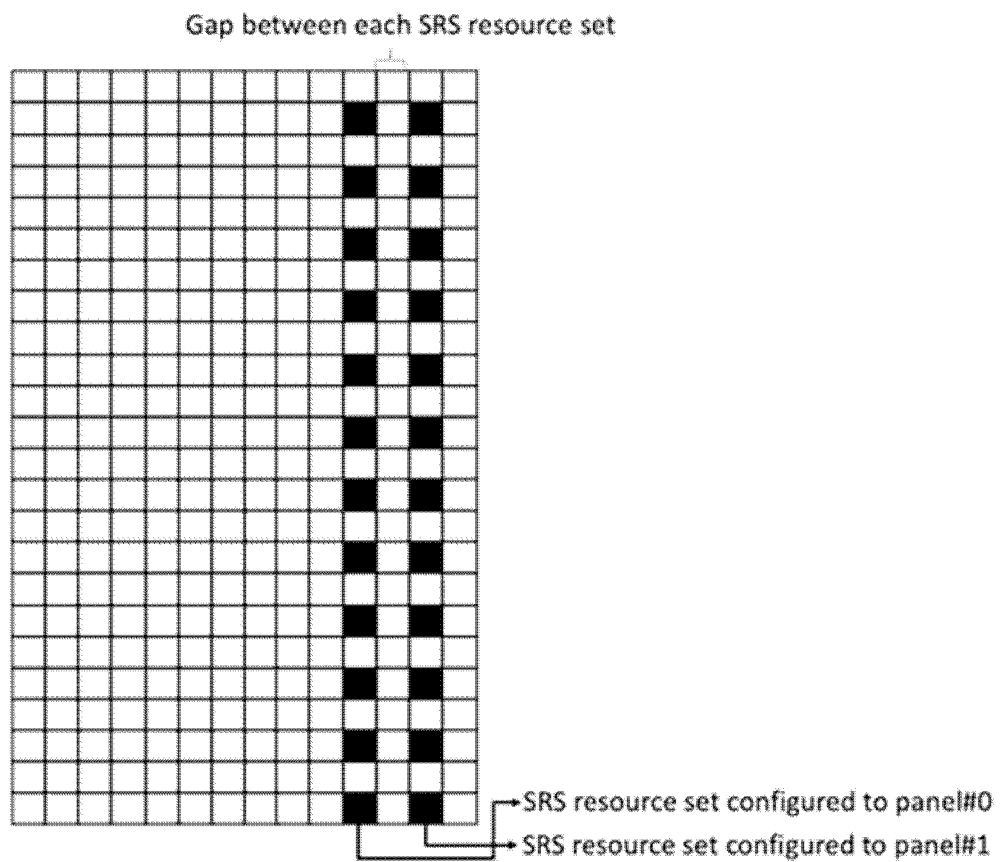
FIG. 5 illustrates an overview of a timing gap between two SRS-NCB resource sets configured to different UE panels according to an example implementation of the present disclosure.

Please refer to FIG. 5, which illustrates an overview of a timing gap between two SRS-NCB resource sets configured to different UE panels according to an example implementation of the present disclosure. In another example, as shown in FIG. 5, the physical resources allocated for two SRS-NCB resource sets may be mapped to two different panels, and the timing gap between two SRS-NCB resource sets may be predefined as one OFDM symbol.

In some implementations, if the UE is indicated to perform PUSCH repetition in multi-TRP, the maximum number of SRS resources may be limited to N in one SRS resource set. More details are introduced in the following.

In one implementation, the value N may be equal to or less than four for non-CB based PUSCH transmission.

In one implementation, the value N may be related to the number of panels used for transmission.

If the UE only supports one panel transmission, the value N may be four.

If the UE supports two-panel transmission, the value N may be two.

If the UE supports four-panel transmission, the value N may be one.

In one implementation, the value N may be related to the number of TRPs. In one example, if the number of TRPs is two, the value N may be two. In one example, if the number of TRPs is four, the value N may be one.

In some implementations, multiple NZP-CSI-RS resources may be configured to be associated with multiple non-CB SRS resource sets for non-CB PUSCH transmission in a multi-TRP scenario. In one example, individual NZP-CSI-RSs may be associated with individual non-CB SRS resource sets. In one example, the UE may not expect spatial relation information for SRS resource(s) within a non-CB SRS resource set and the associated NZP-CSI-RS of the non-CB SRS resource set to be configured at the same time. Noticeably, each non-CB SRS resource set may correspond to different UE panels. The beam information related to non-CB SRS resource transmission from different panels may be derived by the associated NZP-CSI-RSs (e.g., by doing the channel estimation on associated NZP-CSI-RSs or acquiring the QCL information of the associated NZP-CSI-RS resources).

In one implementation, the relationship between NZP-CSI-RS resources and UE panels may be informed to the UE via dedicated RRC message or DCI. In one example, the UE may report that the number of activated panels thereof is Y, where Y may be two or three. Then Y NZP-CSI-RS resources may be configured to the UE, and the active panel of the UE that is used to receive which NZP-CSI-RS resource may be indicated via dedicated RRC message or DCI. After the UE receives the NZP-CSI-RS resource, the UE may derive the spatial domain properties (e.g., beam information, channel condition, etc.) related to the transmission from the corresponding active UE panel. Then the SRS-NCB resource sets associated with received NZP-CSI-RS resources may be transmitted by corresponding UE active panels according to the spatial domain properties (e.g. beam, channel weighting, etc.) derived from the NZP-CSI-RSs. Finally, applicable rank(s) (or layer(s)), precoder(s), and panel(s) applied to transmit PUSCH repetitions of one UL TB in multi-TRP may be indicated to the UE via DCI or dedicated RRC message.

Multiple SRIs (e.g., Beam Directions and Rank (or Layer) Indications) Signalling for PUSCH Repetition in Multi-TRP As shown in FIG. 2, the UE may perform PUSCH repetition in multi-TRP for enhanced transmission reliability. Since different TRPs may be located in different geographical areas, each TRP may need individual beam direction, transmission rank (or layer), precoder, and/or panel indication for the corresponding PUSCH transmission. As such, performing PUSCH repetition in multi-TRP may need to support indicating multiple sets of transmit parameters in a scheduling DCI. The transmission parameter may include, but is not limited to, precoder, at least one of spatial domain property, rank (or layer) indication, panel indication, or a combination of any two or more from the above. A set of transmission parameters may be provided via, e.g., an SRI field in a scheduling DCI. More details are introduced in the following.

In some implementations, the number of SRI fields (or at least one of the fields used to indicate to the UE the applicable precoder, rank (or layer), and panel used for PUSCH transmission) in single DCI may be predefined as N.

In one implementation, the SRI fields may be carried in the form of a TCI field of the DCI. One TCI field provides TCI-state information or spatial relation information that may be applicable for PUSCH transmission.

In one implementation, the value N may be related to the number of TRPs. In one example, if the number of TRPs is two, the UE may expect that there are two SRI fields (or at least one or more of panel indication fields, beam indication fields, and rank (or layer) indication fields) in the DCI. In one example, if the number of TRPs is four, a UE may expect that there are four SRI fields in the DCI.

In one implementation, the value N may be related to a number of active UE panels or a number of total UE panels. In one example, if the number of panels is two, the UE may expect two sets of transmission parameters to be carried in the DCI. In one example, a set of transmission parameters may be indicated by at least one of the SRI field, the panel indication field, the beam indication field, and the rank (or layer) indication field. In one example, two SRI fields are used for delivering two sets of transmission parameters. In one example, the two sets of transmission parameters are carried by one single extended SRI field. The extended SRI field provides two sets of information for transmitting PUSCH by applying two panels sequentially.

In one implementation, the value N may be related to the number of corresponding NZP-CSI-RS resources configured to the UE. Noticeably, the beam information related to SRS-NCB transmission from different panels may be derived by the associated NZP-CSI-RSs. In one example, if the number of associated NZP-CSI-RS resources configured to the UE is two, the UE may expect two sets of transmission parameters to be carried in the DCI. In one example, a set of transmission parameters may be indicated by at least one of the SRI field, the panel indication field, the beam indication field, and the rank (or layer) indication field. In one example, two SRI fields are used for delivering two sets of transmission parameters. In one example, the two sets of transmission parameters are carried by one single extended SRI field. The extended SRI field provides two sets of information for transmitting PUSCH by applying two panels sequentially.

In some implementations, the bit length of SRI field in the DCI used for PUSCH transmission in multi-TRP may be related to the number of TRP or the number of UE panels.

In one implementation, the bit length may be $[N_{TRP} \log_2 N_{SRS}]$, where $N_{TRP}$ is the number of TRPs that may be configured or predefined, and $N_{SRS}$ is the number of SRS resources in an SRS resource set. In one example, $N_{TRP}$ is the number of UE panels.

In some implementations, the bit length of the SRI field in the DCI used for PUSCH transmission in multi-TRP may be related to the (pre-configured) number of repetitions.

RV, Ranks (or Layers), and Panels Scheduling for Each PUSCH Repetition of the UL TB Each PUSCH repetition triggered by the same DCI may be associated with different RVs, ranks (or layers), and/or panels (or beams). More details are introduced in the following.

In some implementations, the same RV of a single codeword (or TB) may be mapped/spread to N PUSCH repetitions. For example, as shown in FIG. 3, RV #0 of the codeword may be mapped/spread to PUSCH Rep. #0 and Rep. #2 in PUSCH transmission. Similarly, RV #2 of the codeword may be mapped/spread to PUSCH Rep. #1 and Rep. #3 in PUSCH transmission. Noticeably, the value N may be explicitly indicated to the UE via DCI, RRC message, or SI. Alternatively, the value N may be implicitly indicated to the UE. For example, if the UE is configured with the total number of PUSCH repetitions being K2 and the number of RVs being K3, then the N may be ⌈K2/K3⌉.

In some implementations, the RV indicated to each PUSCH repetition of a UL TB for transmission may be predefined. For example, RV #0, #2, #3, and #1 may be applied to PUSCH Rep. #0, Rep. #1, Rep. #2, and Rep. #3 for transmission, respectively, according to the predefined RV-to-PUSCH mapping rule.

In some implementations, the same rank (or layer) and/or panel may be applied to transmit a whole PUSCH repetition of the UL TB. For example, two rank (or layer) values (e.g., 1 and 2) and the number of PUSCH repetitions of the UL TB (e.g., 4) are configured to the UE. As such, the UE may apply panel #0 and rank (or layer) value one to transmit PUSCH Rep. #0 and Rep. #2, and may apply panel #1 and rank (or layer) value two to transmit PUSCH Rep. #1 and Rep. #3.

In some implementations, the rank (or layer) and/or panel may be switched between two contiguous PUSCH repetitions of the UL TB. In some embodiments, multiple RV fields may be provided to the UE for transmitting PUSCH repetitions of the UL TB in multi-TRP.

Figure 6:
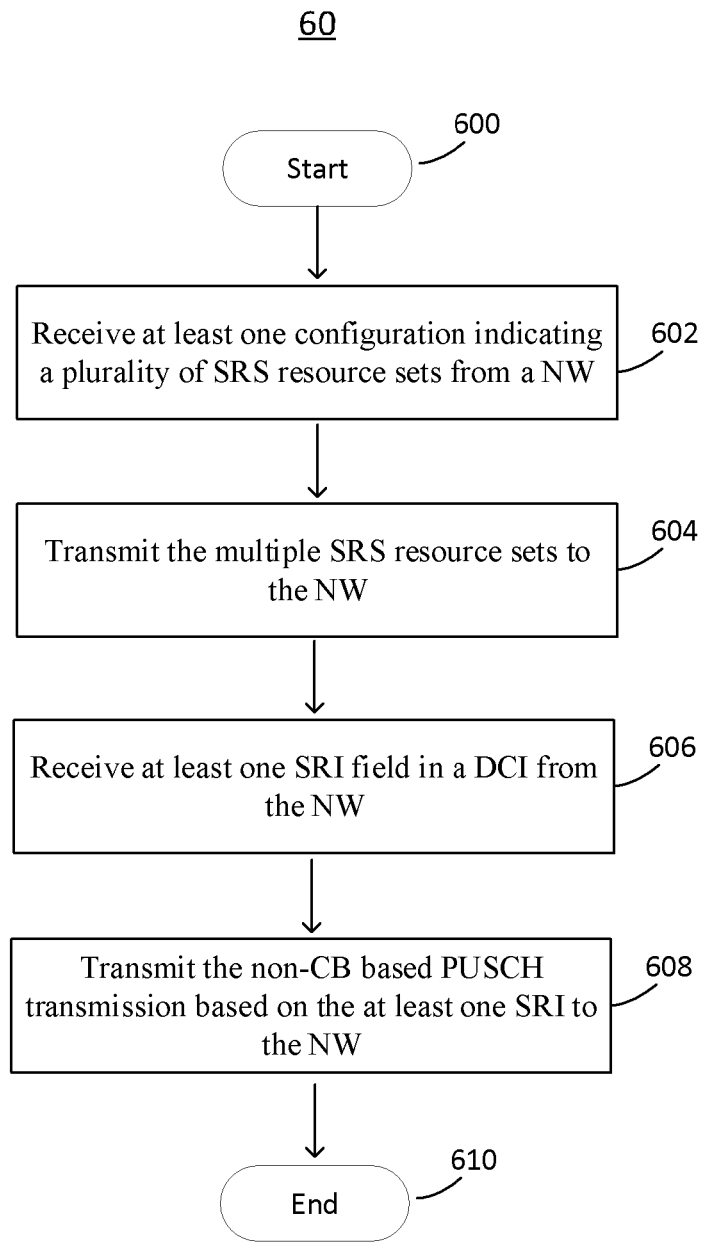
FIG. 6 illustrates a procedure for non-CB based PUSCH transmission performed by a UE according to an implementation of the present disclosure.

Please refer to FIG. 6, which illustrates a procedure 60 for non-CB based PUSCH transmission performed by a UE according to an implementation of the present disclosure. As shown in FIG. 6, the procedure 60 for the UE includes the following actions:

Action 600: Start.

Action 602: Receive at least one configuration indicating a plurality of SRS resource sets from a NW.

Action 604: Transmit the multiple SRS resource sets to the NW.

Action 606: Receive at least one SRI field in a DCI from the NW.

Action 608: Transmit the non-CB based PUSCH transmission based on the at least one SRI to the NW.

Action 610: End.

Preferably, action 602 to action 608 of the procedure 60 may be performed by the UE. In some implementations, in action 602, the UE may receive the at least one configuration indicating the plurality of SRS resource sets from the NW, where each of the multiple SRS resource sets is transmitted to the NW in different time slots, different OFDM symbols, or different subframes. In action 604, the UE may transmit the multiple SRS resource sets to the NW. In action 606, the UE may receive the at least one SRI field in the DCI from the NW. In action 608, the UE may transmit the non-CB based PUSCH transmission based on the at least one SRI to the NW. Certainly, the detailed mechanisms and/or operations (e.g., action 602 to action 608) of the procedure 60 are described in the above paragraphs and omitted hereinafter for brevity.

In some implementations, the NW may include multiple TRPs to indicate the plurality of SRS resource sets, and each of the plurality of SRS resource sets includes a plurality of SRS resources. In some implementations, the procedure 60 may instruct the UE to inform the NW whether the UE can support the fast panel switching or the cyclic beam switching for the non-CB based PUSCH transmission. In some implementation, the number of SRS resources of each of the plurality of SRS resource sets may be configured by the NW via the RRC signaling. In some implementations, the plurality of SRS resource sets may correspond to different panels of the UE.

In some implementations, the NW may configure different spatial domain properties to the UE via the at least one SRI field for transmitting the non-CB based PUSCH transmission. In some implementations, the NW may configure the plurality of SRS resource sets to the UE for channel estimation, and the plurality of SRS resources of each of the plurality of SRS resource sets correspond to the same UL beam or the same panel of the UE.

Figure 7:
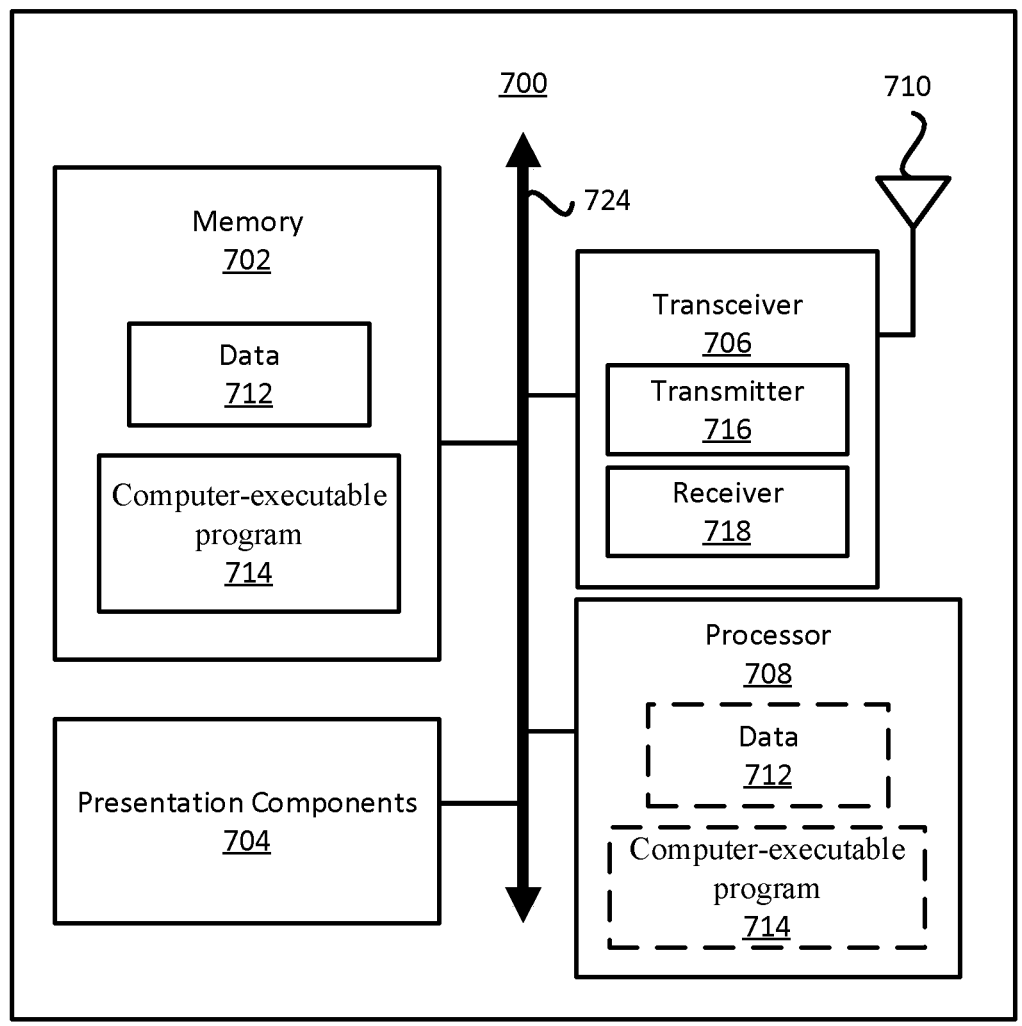
FIG. 7 illustrates a block diagram of a node for wireless communication according to an implementation of the present disclosure.

Please refer to FIG. 7, which illustrates a block diagram of a node 700 for wireless communication according to an implementation of the present disclosure. As illustrated in FIG. 7, the node 700 includes a transceiver 706, a processor 708, a memory 702, one or more presentation components 704, and at least one antenna 710. The node 700 may also include a Radio Frequency (RF) spectrum band module, a BS communications module, an NW communications module, and a system communications management module, input/output (I/O) ports, I/O components, and power supply (not explicitly illustrated in FIG. 7). Each of these components may be in communication with each other, directly or indirectly, over one or more buses 724. The node 700 may be a UE or a BS that performs various functions disclosed herein, for example, with reference to FIG. 6.

The transceiver 706 includes a transmitter 716 (e.g., transmitting/transmission circuitry) and a receiver 718 (e.g., receiving/reception circuitry) and may be configured to transmit and/or receive time and/or frequency resource partitioning information. The transceiver 706 may be configured to transmit in different types of subframes and slots, including, but not limited to, usable, non-usable, and flexibly usable subframes and slot formats. The transceiver 706 may be configured to receive data and control channels.

The node 700 may include a variety of computer-readable media. Computer-readable media may be any available media that may be accessed by the node 700 and include both volatile (and non-volatile) media and removable (and non-removable) media. By way of example, and not limitation, computer-readable media may include computer storage media and communication media. Computer storage media may include both volatile (and non-volatile) and removable (and non-removable) media implemented according to any method or technology for storage of information such as computer-readable storage.

Computer storage media includes RAM, ROM, EEPROM, flash memory (or other memory technology), CD-ROM, Digital Versatile Disks (DVD) (or other optical disk storage), magnetic cassettes, magnetic tape, magnetic disk storage (or other magnetic storage devices), etc. Computer storage media does not include a propagated data signal. Communication media may typically embody computer-readable instructions, data structures, program modules, or other data in a modulated data signal, such as a carrier wave, or other transport mechanism and include any information delivery media.

The term "modulated data signal" may refer to a signal that has one or more of its characteristics set or changed in such a manner as to encode information in the signal. By way of example, and not limitation, communication media may include wired media, such as a wired NW or direct-wired connection, and wireless media, such as acoustic, RF, infrared, and other wireless media. Combinations of any of the previous disclosure should also be included within the scope of computer-readable media.

The memory 702 may include computer-storage media in the form of volatile and/or non-volatile memory. The memory 702 may be removable, non-removable, or a combination thereof. For example, the memory 702 may include solid-state memory, hard drives, optical-disc drives, etc.

As illustrated in FIG. 7, the memory 702 may store a computer-executable (or readable) program 714 (e.g., software codes) that are configured to, when executed, cause the processor 708 to perform various functions disclosed herein, for example, with reference to FIG. 6. Alternatively, the computer-executable program 714 may not be directly executable by the processor 708, but may be configured to cause the node 700 (e.g., when compiled and executed) to perform various functions disclosed herein.

The processor 708 (e.g., having processing circuitry) may include an intelligent hardware device, a Central Processing Unit (CPU), a microcontroller, an ASIC, etc. The processor 708 may include memory. The processor 708 may process the data 712 and the computer-executable program 714 received from the memory 702, and information received via the transceiver 706, the baseband communications module, and/or the NW communications module. The processor 708 may also process information to be sent to the transceiver 706 for transmission through the antenna 710 to the NW communications module for subsequent transmission to a CN.

One or more presentation components 704 may present data to a person or other device. Examples of presentation components 704 may include a display device, speaker, printing component, vibrating component, etc.

From the present disclosure, it is manifested that various techniques may be used for implementing the disclosed concepts without departing from the scope of those concepts. Moreover, while the concepts have been disclosed with specific reference to certain implementations, a person of ordinary skill in the art would recognize that changes may be made in form and detail without departing from the scope of those concepts. As such, the disclosed implementations are to be considered in all respects as illustrative and not restrictive. It should also be understood that the present disclosure is not limited to the particular disclosed implementations. Many rearrangements, modifications, and substitutions are possible without departing from the scope of the present disclosure.

What is claimed is:

1. A method performed by a User Equipment (UE) for multiple Transmission Reception Points (TRPs) based non-codebook Physical Uplink Shared Channel (PUSCH) transmission, the method comprising:
   receiving, from a Base Station (BS), a configuration indicating two Sounding Reference Signal (SRS) resource sets, each having a usage parameter indicated as "non-codebook";
   receiving, from the BS, a Radio Resource Control (RRC) message configuring a mapping pattern between the two SRS resource sets and a plurality of PUSCH repetitions;
   receiving, from the BS, an Uplink (UL) Downlink Control Information (DCI) including two SRS Resource Indicator (SRI) fields; and
   transmitting, to the BS, the plurality of PUSCH repetitions according to the two SRI fields indicated in the UL DCI and the mapping pattern, wherein
   the two SRI fields determine two precoders and two transmission ranks, that include a first set of transmission ranks and a second set of transmission ranks, applied for the plurality of PUSCH repetitions associated with the two SRS resource sets, and
   a number of the first set of transmission ranks and a number of the second set of transmission ranks, determined by the two SRI fields, are the same.

2. The method of claim 1, wherein the mapping pattern between the two SRS resource sets and the plurality of PUSCH repetitions is a cyclical mapping pattern.

3. A User Equipment (UE) in a wireless communication system for multiple Transmission Reception Points (TRPs) based non-codebook Physical Uplink Shared Channel (PUSCH) transmission, the UE comprising:
   at least one processor; and
   at least one non-transitory computer-readable medium coupled to the at least one processor and storing one or more computer-executable instructions that, when executed by the at least one processor, cause the UE to:
   receive, from a Base Station (BS), a configuration indicating two Sounding Reference Signal (SRS) resource sets, each having a usage parameter indicated as "non-codebook";
   receive, from the BS, a Radio Resource Control (RRC) message configuring a mapping pattern between the two SRS resource sets and a plurality of PUSCH repetitions;
   receive, from the BS, an Uplink (UL) Downlink Control Information (DCI) including two SRS Resource Indicator (SRI) fields; and
   transmit, to the BS, the plurality of PUSCH repetitions according to the two SRI fields indicated in the UL DCI and the mapping pattern, wherein
   the two SRI fields determine two precoders and two transmission ranks, that include a first set of transmission ranks and a second set of transmission ranks, applied for the plurality of PUSCH repetitions associated with the two SRS resource sets, and
   a number of the first set of transmission ranks and a number of the second set of transmission ranks, determined by the two SRI fields, are the same.

4. The UE of claim 3, wherein the mapping pattern between the two SRS resource sets and the plurality of PUSCH repetitions is a cyclical mapping pattern.

5. A Base Station (BS) in a wireless communication system for multiple Transmission Reception Points (TRPs) based non-codebook Physical Uplink Shared Channel (PUSCH) transmission, the BS comprising:
   at least one processor; and
   at least one non-transitory computer-readable medium coupled to the at least one processor and storing one or more computer-executable instructions that, when executed by the at least one processor, cause the BS to:
   transmit, to a User Equipment (UE), a configuration indicating two Sounding Reference Signal (SRS) resource sets, each having a usage parameter indicated as "non-codebook";
   transmit, to the UE, a Radio Resource Control (RRC) message configuring a mapping pattern between the two SRS resource sets and a plurality of PUSCH repetitions;
   transmit, to the UE, an Uplink (UL) Downlink Control Information (DCI) including two SRS Resource Indicator (SRI) fields; and
   receive, from the UE, the plurality of PUSCH repetitions according to the two SRI fields indicated in the UL DCI and the mapping pattern, wherein
   the two SRI fields determine two precoders and two transmission ranks, that include a first set of transmission ranks and a second set of transmission ranks, applied for the plurality of PUSCH repetitions associated with the two SRS resource sets, and
   a number of the first set of transmission ranks and a number of the second set of transmission ranks, determined by the two SRI fields, are the same.

6. The BS of claim 5, wherein the mapping pattern between the two SRS resource sets and the plurality of PUSCH repetitions is a cyclical mapping pattern.

* * * * *